United States Patent
Knoble et al.

(10) Patent No.: US 8,040,078 B1
(45) Date of Patent: Oct. 18, 2011

(54) LED DIMMING CIRCUIT

(75) Inventors: David W. Knoble, Tupelo, MS (US); Khosrow Jamasbi, Belden, MS (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 308 days.

(21) Appl. No.: 12/481,299

(22) Filed: Jun. 9, 2009

(51) Int. Cl.
- *G05F 1/00* (2006.01)
- *H05B 37/02* (2006.01)
- *H05B 39/04* (2006.01)
- *H05B 41/36* (2006.01)

(52) U.S. Cl. ........ 315/291; 315/129; 315/149; 315/308; 323/905

(58) Field of Classification Search .................. 315/129, 315/134, 149, 200 R, 246, 291, 292, 297, 315/307, 308, DIG. 4; 323/905
See application file for complete search history.

(56) References Cited

U.S. PATENT DOCUMENTS

| | | |
|---|---|---|
| 3,246,201 A | 4/1966 | Michalski |
| 3,659,146 A | 4/1972 | Munson |
| 3,714,654 A | 1/1973 | Wicks |
| 4,177,500 A | 12/1979 | Nicholl |
| 4,225,808 A | 9/1980 | Saraceni |
| 4,433,328 A | 2/1984 | Saphir |
| 4,453,123 A | 6/1984 | Erkman |
| 4,590,455 A | 5/1986 | Fritzinger |
| 4,982,176 A | 1/1991 | Schwarz |
| 4,999,749 A | 3/1991 | Dormand |
| 5,075,833 A | 12/1991 | Dormand |
| 5,214,352 A | 5/1993 | Love |
| 5,227,762 A | 7/1993 | Guidette |
| 5,475,360 A | 12/1995 | Guidette |
| 5,557,170 A | 9/1996 | Ooms |
| 5,790,040 A | 8/1998 | Kreier |
| 5,867,099 A | 2/1999 | Keeter |
| 5,917,287 A | 6/1999 | Haederle |
| 6,106,126 A | 8/2000 | Neustadt |
| 6,118,371 A | 9/2000 | Haddad |
| 6,166,640 A | 12/2000 | Nishihira |
| 6,276,814 B1 | 8/2001 | Gough |
| 6,341,877 B1 | 1/2002 | Chong |
| 6,392,541 B1 | 5/2002 | Bucher |
| 6,489,729 B1 | 12/2002 | Erhardt |
| 6,548,967 B1 | 4/2003 | Dowling |
| 6,639,369 B2 | 10/2003 | Ribarich |
| 6,667,587 B1 | 12/2003 | Chang |
| 6,703,795 B2 | 3/2004 | Johnson |
| 6,799,875 B2 | 10/2004 | Flokstra |
| 6,897,624 B2 | 5/2005 | Lys |
| 6,927,368 B2 | 8/2005 | Cao |
| 6,927,541 B2 | 8/2005 | Lee |
| 6,943,687 B2 | 9/2005 | Lee |

(Continued)

FOREIGN PATENT DOCUMENTS

EP     0183353 A2     12/1997

(Continued)

*Primary Examiner* — Shawki Ismail
*Assistant Examiner* — Dylan White

(57) ABSTRACT

A LED dimming circuit is provided. The LED dimming circuit has an LED driver, an LED dimmer, and at least one LED light source. A resistor is connected between a dimming control output of the LED dimmer and dimming control input of the LED dimmer. The LED dimming circuit may optionally include a fluorescent slide dimmer. The fluorescent slide dimmer may have a first connection to the dimming control input of the LED dimmer and a second connection to a circuit common of the LED dimmer. A method of providing an LED dimming circuit for dimming at least one LED light source using a fluorescent dimmer is also provided.

17 Claims, 1 Drawing Sheet

U.S. PATENT DOCUMENTS

Figure 1:
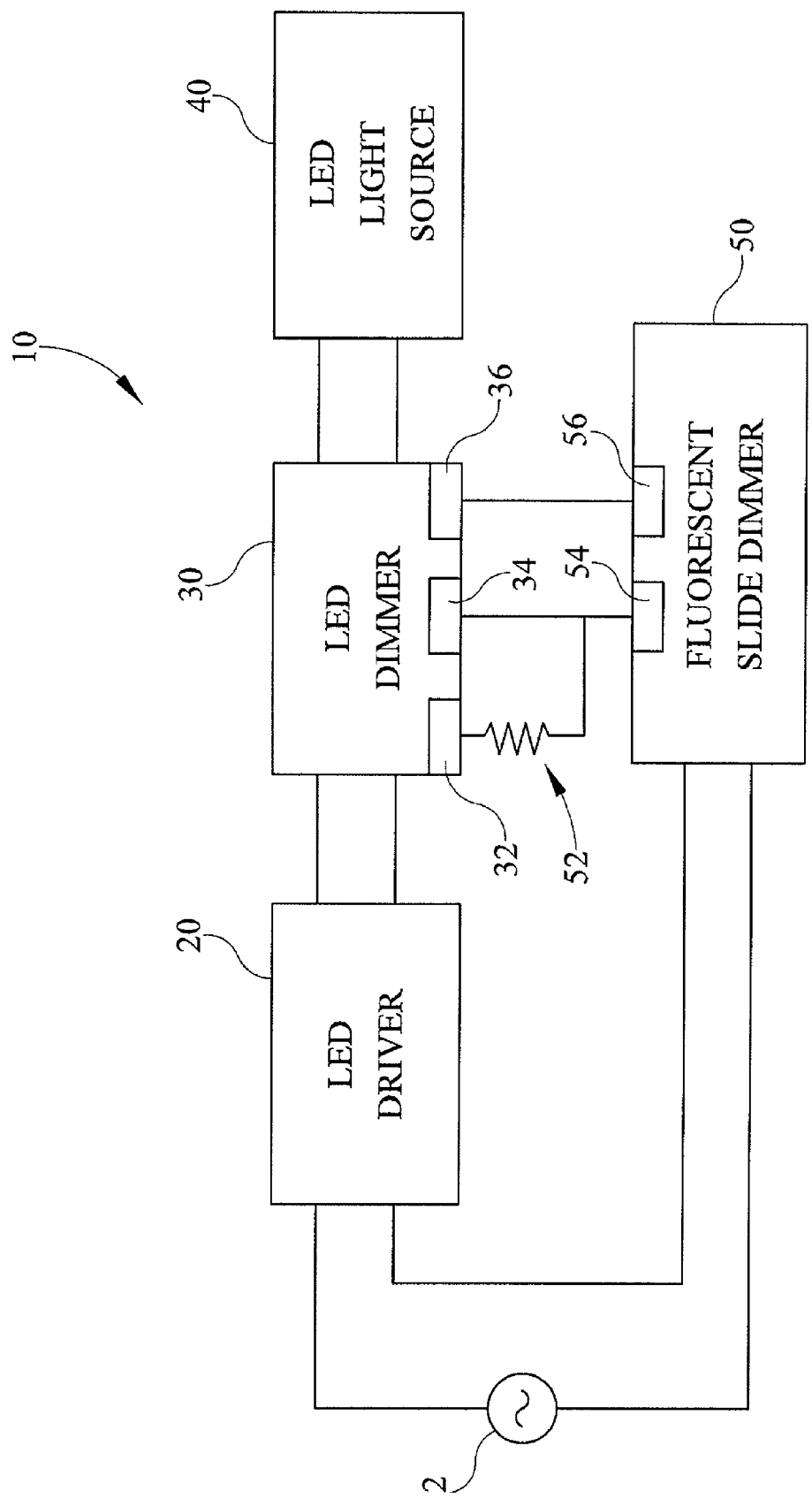

| | | |
|---|---|---|
| 6,986,589 B2 | 1/2006 | Evans |
| 7,021,787 B1 | 4/2006 | Kuelbs |
| 7,035,015 B2 | 4/2006 | Teijido |
| 7,038,399 B2 | 5/2006 | Lys |
| 7,086,747 B2 | 8/2006 | Nielson |
| 7,097,319 B2 | 8/2006 | Mauk |
| 7,121,684 B2 | 10/2006 | Barozzini |
| 7,178,952 B2 | 2/2007 | Bucher |
| 7,182,547 B1 | 2/2007 | Leonhardt |
| 7,186,002 B2 | 3/2007 | Matthews |
| 7,207,690 B2 | 4/2007 | Haugaard |
| 7,220,029 B2 | 5/2007 | Bynum |
| 7,221,271 B2 | 5/2007 | Reime |
| 7,262,559 B2 * | 8/2007 | Tripathi et al. ............ 315/291 |
| 7,312,587 B2 | 12/2007 | Okishima |
| 7,352,138 B2 | 4/2008 | Lys |
| 7,358,679 B2 | 4/2008 | Lys |
| 7,397,194 B2 | 7/2008 | Garbowicz |
| 7,499,294 B2 | 3/2009 | Lin |
| 7,812,550 B2 * | 10/2010 | Harmgardt et al. ............ 315/291 |
| 2002/0034070 A1 | 3/2002 | Kumagai |
| 2002/0145878 A1 | 10/2002 | Venegas |
| 2002/0152045 A1 | 10/2002 | Dowling |
| 2003/0222587 A1 | 12/2003 | Dowling |
| 2004/0022058 A1 | 2/2004 | Birrell |
| 2006/0092638 A1 | 5/2006 | Harwood |
| 2007/0008726 A1 | 1/2007 | Brown |
| 2007/0076416 A1 | 4/2007 | Leonhardt |
| 2007/0085517 A1 | 4/2007 | Ribarich |
| 2008/0197790 A1 | 8/2008 | Mangiaracina |
| 2008/0315791 A1 | 12/2008 | Melanson |
| 2009/0034301 A1 | 2/2009 | Chou |
| 2010/0045210 A1 * | 2/2010 | Hariharan ............ 315/297 |
| 2011/0037418 A1 * | 2/2011 | Park ............ 315/307 |
| 2011/0068704 A1 * | 3/2011 | McKinney ............ 315/210 |

FOREIGN PATENT DOCUMENTS

| | | |
|---|---|---|
| WO | 9946962 A1 | 9/1999 |

* cited by examiner

US 8,040,078 B1

LED DIMMING CIRCUIT

CROSS-REFERENCE TO RELATED DOCUMENTS

Not Applicable.

BACKGROUND

1. Field of the Invention

This invention pertains generally to a LED dimming circuit, and more particularly to a LED dimming circuit for use with a fluorescent dimmer.

2. Description of the Related Art

LED dimming circuits often use a potentiometer to effectuate dimming of an LED light source. The potentiometer may be actuated by a user to vary the characteristics of power being supplied to the LED light source in order to alter the light output of the LED light source.

SUMMARY OF THE INVENTION

In some embodiments an LED dimming circuit has at least one LED light source, an LED driver, an LED dimmer, and a fluorescent dimmer. The LED driver is configured to receive an AC signal and produce a first DC signal. The LED dimmer is connected to the LED driver and the at least one LED light source and has a dimming control input, a dimming control output, a circuit common, and a variable LED dimmer output. The LED dimmer receives the first DC signal from the LED driver and outputs the variable LED dimmer output to the at least one LED light source to power the at least one LED light source at a desired light output level. The variable LED dimmer output is dependent on at least one characteristic of a signal received by the dimming control input of the LED dimmer. The fluorescent dimmer has a first connection to the dimming control input of the LED dimmer and a second connection to the circuit common of the LED dimmer. A resistor is connected between the dimming control output of the LED dimmer and the first connection of the LED dimmer. Adjustment of the fluorescent dimmer varies at least one characteristic of the signal received by the dimming control input.

In some embodiments an LED dimming circuit for use with a fluorescent dimmer has an LED driver, an LED dimmer, and a resistor. The LED driver is configured to receive an AC signal and produce a first DC signal. The LED dimmer is connected to the LED driver and connectable to at least one LED light source. The LED dimmer has a dimming control input, a dimming control output, a circuit common, and a variable LED dimmer output. The LED dimmer receives the first DC signal from the LED driver and outputs the variable LED dimmer output to the at least one LED light source to power the at least one LED light source at a desired light output level. The variable LED dimmer output is dependent on at least one characteristic of a signal received by the dimming control input of the LED dimmer. The resistor is coupled between the dimming control output and the dimming control input.

A method of providing an LED dimming circuit for dimming at least one LED light source using a fluorescent dimmer is also provided. The method includes providing an LED driver electrically coupled to an LED dimmer, providing a resistor connected between a dimming control output of the LED dimmer and a dimming control input of the LED dimmer, and instructing a user to couple a first fluorescent dimmer connection to the dimming control input of the LED dimmer and a second fluorescent dimmer connection to the circuit common of the LED dimmer.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawing, wherein:

FIG. 1 is a schematic of an embodiment of an LED dimming circuit having a fluorescent dimmer.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring to FIG. 1, an LED dimming circuit 10 has an LED driver 20, an LED dimmer 30, and a fluorescent dimming control 50. The LED dimming circuit 10 may be coupled to an AC power source 2 and is configured to selectively power and selectively dim an LED light source 40. The fluorescent dimming control 50 may be a fluorescent slide dimmer as depicted. AC power source 2 is coupled to the LED driver 20. In the depicted embodiment of LED dimming circuit 10, the neutral lead of the AC power source 2 is indirectly coupled to the LED driver 20, first passing through the fluorescent slide dimmer 50, enabling the fluorescent slide dimmer 50 to selectively interrupt the supply of AC power to the LED driver 20. AC power source 2 may be a mains power supply such as, for example, a 120 Volt 60 Hz power supply or a 240 Volt 60 Hz power supply. In some embodiments of the LED dimming circuit 10 the LED driver 20 may be a Magtech LP1040-24 switch-mode LED driver that converts AC input into 24 Volt DC output.

The LED driver 20 is coupled to the LED dimmer 30, with output of the LED driver 20 being fed to the LED dimmer 30. In some embodiments the LED dimmer 30 may be a Magtech CC2512H2-2000 constant current LED dimmer that receives 24 Volt DC output from the LED driver 20 and produces an output that can be pulse width modulated to drive one or more LEDs at varying output levels. The LED dimmer 30 is coupled to an LED light source 40. The LED dimmer 30 provides a variable output to the LED light source 40, meaning that the output being supplied to the LED light source 40 by the LED dimmer 30 may be selectively varied in order to effectuate dimming of the LED light source 40. For example, the output of the LED dimmer 30 may be pulse width modulated in order to effectuate dimming of the LED light source 40. The output of the LED Dimmer 30 may be varied to adjust the light output of the LED light source 40 to a desired light output level. For example, in some embodiments the output of the LED Dimmer 30 may be varied to adjust the light output of the LED light source 40 from full light output to approximately 23% light output with minimal to no flicker from the LED light source 40.

The LED dimmer 30 has a dimming control output 32, a dimming control input 34, and a ground or circuit common 36. The dimming control output 32 may be capable of producing 0-10 V DC output. The output of the LED dimmer 30 that is supplied to the LED light source 40 is dependent on the input to the dimming control input 34. Fluorescent slide dimmer 50 has a negative connection 56 and a positive connection 54. The negative connection 56 of the fluorescent dimmer 50 is connected to the circuit common 36 of the LED dimmer 30 and the positive connection 54 of the fluorescent dimmer 50 is connected to the dimming control input 34 of the LED dimmer 30. A resistor 52 is additionally connected between the dimming control output 32 of the LED dimmer 30 and the positive connection 54 of the fluorescent slide dimmer 50. In some embodiments the resistor 52 may have a resistance from approximately 10 kΩ to approximately 20 kΩ, such as, for example, a resistance of 15 KΩ. The fluorescent slide dimmer 50 may be a 0-10 Volt Lightolier V2000FAMUW Fluorescent Slide Dimmer.

A slide on the fluorescent slide dimmer 50 may be actuated by a user to vary the input to the dimming control input 34 of the LED dimmer 30, causing the output of the LED dimmer 30 being supplied to the LED light source 40 to be varied. A user may also actuate one or more controls on the fluorescent slide dimmer 50 to break the connection between the neutral line of the AC power source 2 and the LED driver 20. For example, a slide on the fluorescent slide dimmer 50 may be slid to a far edge to break the connection. Other fluorescent dimmers 50 may be used, including those that use other structure besides a slide to effectuate dimming. For example, fluorescent dimmer 50 may be used that have knobs and/or touch pads.

LED light source 40 may be any LED luminaire having at least one LED. In some embodiments the LED light source 40 may be a plurality of LED luminaires in series connection with one another. Although LED driver 20, LED dimmer 30, and fluorescent slide dimmer 50 are shown in FIG. 1 as separate components, in some embodiments some or all could be integrated into a single component part. For example, LED driver 20 and LED dimmer 30 may be integrated into a single component part. Also, it is understood that in some embodiments the LED dimming circuit may be configured for use with a fluorescent slide dimmer but provided without a fluorescent slide dimmer. For example, the LED dimming circuit may be provided with LED driver 20, LED dimmer 30, and a resistor installed in parallel between the dimming control output 32 and the dimming control input 34. A user may then couple a separately purchased fluorescent slide dimmer 50 to the LED dimming circuit by connecting the negative connection 56 of the fluorescent dimmer 50 to the circuit common 36 of the LED dimmer 30 and the positive connection 54 of the fluorescent dimmer 50 to the dimming control input 34 of the LED dimmer 30. The fluorescent slide dimmer 50 may be a dimmer that was already present at the installation site.

The foregoing description has been presented for purposes of illustration. It is not intended to be exhaustive or to limit the invention to the precise forms disclosed, and obviously many modifications and variations are possible in light of the above teaching. It is understood that while certain forms of the invention have been illustrated and described, it is not limited thereto except insofar as such limitations are included in the following claims and allowable functional equivalents thereof.

We claim:

1. An LED dimming circuit, comprising:
   at least one LED light source;
   an LED driver configured to receive an AC signal and produce a first DC signal;
   an LED dimmer connected to said LED driver and said at least one LED light source, said LED dimmer having a dimming control input, a dimming control output, a circuit common, and a variable LED dimmer output;
     wherein said LED dimmer receives said first DC signal from said LED driver and outputs said variable LED dimmer output to said at least one LED light source to power said LED light source at a desired light output level, and wherein said variable LED dimmer output is dependent on at least one characteristic of a signal received by said dimming control input;
   a fluorescent dimmer having a first connection to said dimming control input and a second connection to said circuit common;
   a resistor connected between said dimming control output and said first connection;
   wherein adjustment of said fluorescent dimmer varies said at least one characteristic of said signal received by said dimming control input.

2. The LED dimming circuit of claim 1, wherein said resistor has a resistance between 10 kΩ and 20 kΩ.

3. The LED dimming circuit of claim 2, wherein said dimming control output is a 0 to 10 volt output.

4. The LED dimming circuit of claim 3, wherein said variable LED dimmer output is selectively pulse width modulated.

5. The LED dimming circuit of claim 3, wherein said fluorescent dimmer is a 0-10 Volt fluorescent slide dimmer.

6. The LED dimming circuit of claim 3, wherein said desired light output level of said LED light source ranges from a full light output level to an approximately twenty three percent light output level.

7. The LED dimming circuit of claim 3, wherein said fluorescent slide dimmer is connected to said AC signal and said LED driver; and wherein said fluorescent slide dimmer may selectively remove said AC signal from said LED driver.

8. The LED dimming circuit of claim 1, wherein said resistor has a resistance of approximately 15 kΩ.

9. An LED dimming circuit for use with a fluorescent dimmer, comprising:
   an LED driver configured to receive an AC signal and produce a first DC signal;
   an LED dimmer connected to said LED driver and connectable to at least one LED light source, said LED dimmer having a dimming control input, a dimming control output, a circuit common, and a variable LED dimmer output;
     wherein said LED dimmer receives said first DC signal from said LED driver and outputs said variable LED dimmer output; and wherein said variable LED dimmer output is dependent on at least one characteristic of a signal received by said dimming control input;
   a resistor coupled between said dimming control output and said dimming control input;
   wherein said resistor has a resistance between 10 kΩ and 20 kΩ.

10. The LED dimming circuit of claim 9, wherein said resistor has a resistance of approximately 15 kΩ.

11. The LED dimming circuit of claim 10, wherein said dimming control output is a 0 to 10 volt output.

12. The LED dimming circuit of claim 9, wherein said variable LED dimmer output is selectively pulse width modulated.

13. The LED dimming circuit of claim 9, wherein said LED driver dimmer and said LED dimmer are integrated into a single component part.

14. A method of providing an LED dimming circuit for dimming at least one LED light source using a fluorescent dimmer, comprising:
   providing an LED driver electrically coupled to an LED dimmer;
      wherein said LED driver is configured to receive an AC signal and produce a first DC signal;
      wherein said LED dimmer has a dimming control input, a dimming control output, a circuit common, and a variable LED dimmer output;
      wherein said LED dimmer is configured to receive said first DC signal from said LED driver and output said variable LED dimmer output to at least one LED light source to power said LED light source at a desired light output level;
      wherein said variable LED dimmer output is dependent on at least one characteristic of a signal received by said dimming control input;
   providing a resistor connected between said dimming control output of said LED dimmer and said dimming control input of said LED dimmer;
   instructing a user to couple a first fluorescent dimmer connection to said dimming control input of said LED dimmer and a second fluorescent dimmer connection to said circuit common of said LED dimmer.

15. The method of claim 14, wherein said resistor has a resistance between 10 kΩ and 20 kΩ.

16. The method of claim 14, wherein said resistor has a resistance of approximately 15 kΩ.

17. The LED dimming circuit of claim 16, wherein said variable LED dimmer output is selectively pulse width modulated.

* * * * *